US011209280B2

(12) United States Patent
Violetta

(10) Patent No.: US 11,209,280 B2
(45) Date of Patent: Dec. 28, 2021

(54) SYSTEM AND METHOD FOR ROUTE SELECTION

(71) Applicant: Toyota Motor Engineering & Manufacturing North America, Inc., Plano, TX (US)

(72) Inventor: Chase C. Violetta, Milan, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 176 days.

(21) Appl. No.: 16/528,029

(22) Filed: Jul. 31, 2019

(65) Prior Publication Data

US 2021/0033411 A1 Feb. 4, 2021

(51) Int. Cl.
*G01C 21/34* (2006.01)
*G01C 21/36* (2006.01)

(52) U.S. Cl.
CPC ..... *G01C 21/3461* (2013.01); *G01C 21/3484* (2013.01); *G01C 21/3691* (2013.01)

(58) Field of Classification Search
CPC ............ G01C 21/3461; G01C 21/3691; G01C 21/3484
See application file for complete search history.

(56) References Cited

U.S. PATENT DOCUMENTS

| 2015/0177512 | A1* | 6/2015 | Hayakawa ............. G03B 17/08 348/148 |
| 2018/0143298 | A1 | 5/2018 | Newman |
| 2018/0354469 | A1 | 12/2018 | Krishnan |
| 2019/0092287 | A1 | 3/2019 | Leach et al. |
| 2019/0107401 | A1* | 4/2019 | Schmidt ........... G06Q 10/06316 |
| 2019/0161035 | A1* | 5/2019 | Salter ......................... B60S 1/50 |
| 2020/0139941 | A1* | 5/2020 | Jansson .................... G01F 23/74 |
| 2020/0191589 | A1* | 6/2020 | Tamai ................. G01C 21/3484 |
| 2021/0031727 | A1* | 2/2021 | Sakai ...................... B60S 1/485 |

* cited by examiner

*Primary Examiner* — Rami Khatib
(74) *Attorney, Agent, or Firm* — Christopher G. Darrow; Darrow Mustafa PC

(57) ABSTRACT

System, methods, and other embodiments described herein relate to selecting a route for a vehicle to travel. In one embodiment, the routing system determines a travel route for a vehicle by obtaining usage data for one or more segments of travel, the usage data indicating at least an amount of sensor cleaning fluid used during travel of the vehicle along the one or more segments. The routing system determines a plurality of routes to a destination, and selects a route from among the plurality of routes, the route being selected based at least in part on the usage data.

20 Claims, 4 Drawing Sheets

| Segment Start | Segment End | Actions | Amount | Timestamp | Condition |
|---|---|---|---|---|---|
| 41.03, 2.17 | 42.8, 3.9 | 3 | 6mL | 2/3/2019 | Snow |
| 25.84, 12.98 | 26.04, 12.24 | 2 | 2mL | 2/4/2019 | Rain |
| 39.03, 10.11 | 38.75, 10.87 | 4 | 8mL | 2/4/2019 | Rain |
| 36.77, 15.95 | 35.81, 17.41 | 2 | 2mL | 2/5/2019 | Clear |
| 41.03, 2.17 | 42.8, 3.9 | 2 | 4mL | 2/6/2019 | Clear |
| 41.03, 2.17 | 42.8, 3.9 | 1 | 1mL | 2/7/2019 | Clear |

300

| Segment Start | Segment End | Usage Rate | Condition |
|---|---|---|---|
| 41.03, 2.17 | 42.8, 3.9 | 6mL | Snow |
| 25.84, 12.98 | 26.04, 12.24 | 2mL | Rain |
| 39.03, 10.11 | 38.75, 10.87 | 8mL | Rain |
| 36.77, 15.95 | 35.81, 17.41 | 2mL | Clear |
| 41.03, 2.17 | 42.8, 3.9 | 3.5mL | Clear |

305

SYSTEM AND METHOD FOR ROUTE SELECTION

TECHNICAL FIELD

The subject matter described herein relates, in general, to systems and methods for operating a routing system for a vehicle, and, more particularly, to determining routes based at least in part on sensor maintenance conditions.

BACKGROUND

Autonomous vehicles and driver-assist systems in vehicles may be equipped with multiple sensors that enable the vehicles to detect information about the surrounding environment, navigate in the environment, avoid obstacles, and other functions. In many such vehicles, and in manually operated vehicles as well, sensors are a primary source of information that enables the vehicle to carry out a plurality of functions. When a sensor becomes dirty, the effectiveness of the sensor can be diminished and the accuracy of the information obtained through the sensor can be reduced. Accordingly, sensor maintenance can impact the effective travel distance a vehicle may safely traverse along a given route.

Many vehicles are equipped with a sensor maintenance system that can clean the sensors, e.g., using a spray nozzle and cleaning fluid, when the sensors conditions deteriorate below threshold levels. In some autonomous or semi-autonomous vehicles, when such a cleaning action is actuated, the driver must assume manual control of the vehicle for the duration of the cleaning and for an amount of time thereafter. Accordingly, repeated cleaning actions can disrupt continuity of a trip for a passenger who must, in intervals, convert into a driver and back into a passenger.

SUMMARY

The disclosed systems and methods relate to a manner of improving route selection determinations based at least in part on sensor conditions and maintenance.

In one embodiment, a routing system includes one or more sensors configured to acquire information about an environment around the vehicle, one or more reservoirs for storing cleaning fluid for cleaning the one or more sensors, one or more processors, and a memory communicably coupled to the one or more processors and storing: a usage module including instructions that when executed by the one or more processors cause the one or more processors to obtain usage data associated with one or more segments of travel, the usage data indicating at least an amount of the cleaning fluid used while the vehicle traveled along the one or more segments of travel, and a routing module including instructions that when executed by the one or more processors cause the one or more processors to determine a plurality of routes to a destination and select a route from among the plurality of routes based at least in part on the usage data, wherein one or more of the plurality of routes include one or more of the segments of travel.

In another embodiment, a method of determining a travel route for a vehicle includes obtaining usage data for one or more segments of travel, the usage data indicating at least an amount of sensor cleaning fluid used during travel of the vehicle along the one or more segments; determining a plurality of routes to a destination; and selecting a route from among the plurality of routes, the route being selected based at least in part on the usage data.

In another embodiment, a non-transitory computer-readable medium for determining a travel route for a vehicle includes instructions that, when executed by one or more processors, cause the one or more processors to obtain usage data for one or more segments of travel, the usage data indicating at least an amount of sensor cleaning fluid used during travel of the vehicle along the one or more segments, determine a plurality of routes to a destination, and select a route from among the plurality of routes, the route being selected based at least in part on the usage data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
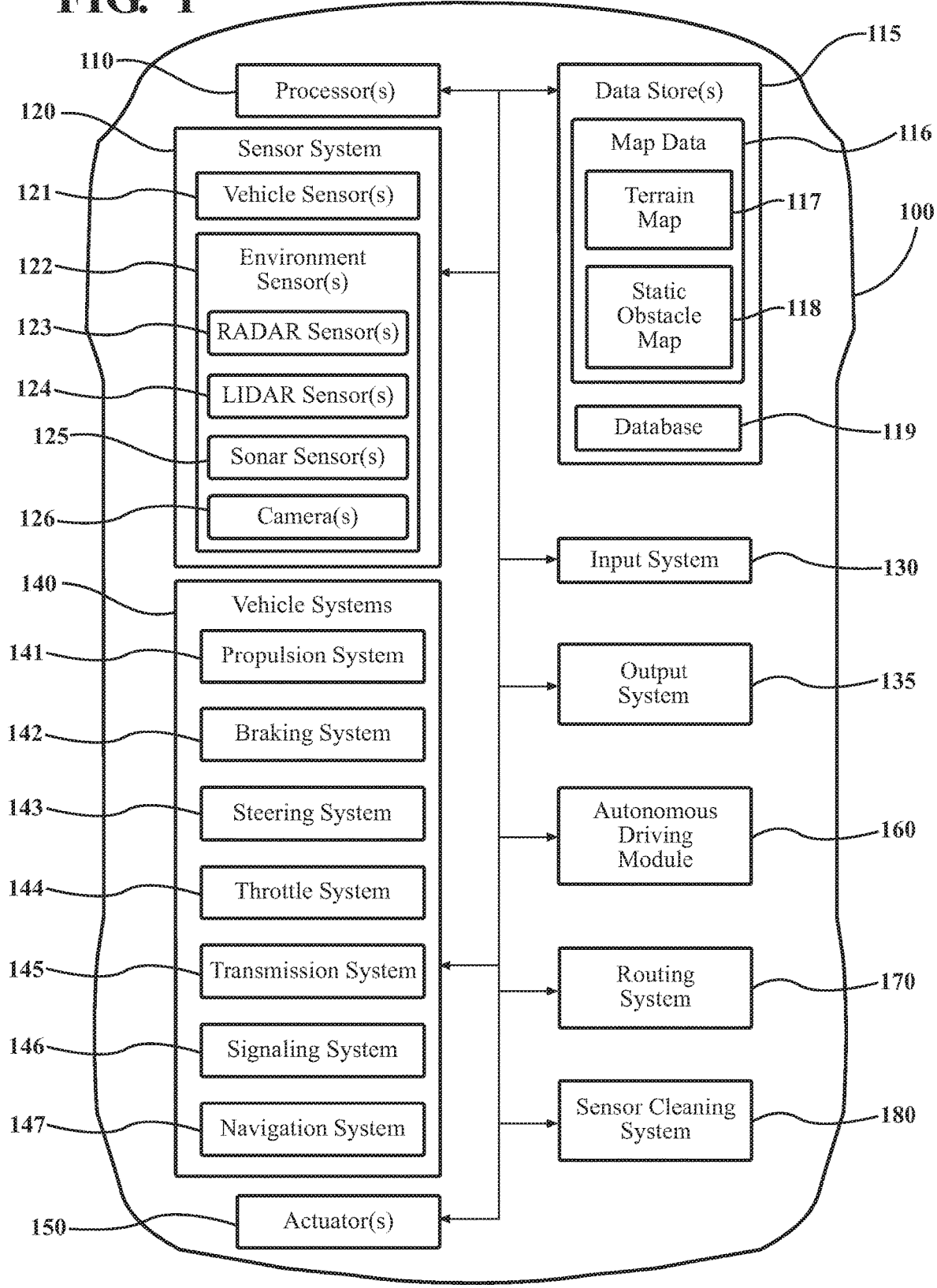
FIG. 1 illustrates one embodiment of a vehicle within which systems and methods disclosed herein may be implemented.

Systems, methods, and other embodiments associated with improving route selection determinations by accounting for sensor conditions and maintenance are disclosed. As mentioned previously, a vehicle may be equipped with one or more sensors that obtain information that aids the vehicle in carrying out various functions, e.g., related to navigation or providing driving aid. For example, a camera sensor can generate data used to detect a position of lines in a road relative to vehicles position to determine whether the vehicle is in a safe position within the lanes, a radar or lidar sensor can generate data that indicates a distance to an obstacle or another vehicle ahead of the vehicle to determine whether evasive action is necessary, and so on. Generally, sensors are susceptible to deteriorations in performance due to accumulation of dust, dirt and debris that occurs in due course of ordinary travel of the vehicle. Accordingly, a vehicle can include a sensor cleaning system that uses cleaning fluid to remove the accumulation of debris that can hinder sensor performance.

While a driver is often well apprised of the status and levels of common vehicle operational needs such as fuel, battery power, and oil, the driver is sometimes unaware of less prominent necessities such as sensor maintenance status and sensor cleaning fluid levels. Nevertheless, the vehicle's ability to function as expected and in safe order can be impacted by a decline in sensor capabilities, particularly in autonomous and semi-autonomous vehicles, which may rely heavily on sensor data. In addition, the cycle of cleaning sensors in an autonomous/semi-autonomous vehicle requires the vehicle to temporarily cease many autonomous operations for the duration of the sensor cleaning process. Typically, the vehicle must either stop or switch to manual operation, with a human driver taking control, until the cleansing operation is complete and the sensors are ready for operation again.

These factors of maintenance, fluid levels and cleaning cycles can affect the continuity and duration of a trip, and correspondingly can be triggered or affected differently along different routes. For example, a hypothetical "trip" from point A to point B may be executed along any of multiple different "routes" in an autonomous vehicle. A first route may include a segment along an older road that contains significantly more loose debris, gravel and dirt, than a second route which primarily utilizes a newly paved road. While the first route may be shorter in overall length than the second route, the impact of the excessive debris on the sensor system may, for example, result in requiring twice as many cleaning cycles, which disrupt the continuity of the trip by requiring stops or repeated stretches of manual driving.

Therefore, a routing system and associated methods are disclosed herein that can evaluate sensor condition, and more particularly, sensor cleaning capacity as it relates to how far the vehicle can travel and the effects that road condition, sensor condition, cleaning cycles, and other factors may have on a route. As will be discussed below, various factors can impact the longevity of and effectiveness of a sensor cleaning system, and the disclosed routing system can take these factors into account in determining how far the vehicle may safely or continuously travel in selecting a route for a trip.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, is equipped with sensors to perceive aspects of the surrounding environment, and thus benefits from the functionality discussed herein.

As shown in FIG. 1, the vehicle 100 includes multiple elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2, 3A, 3B, 4, and 5 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes a routing system 170 and a sensor cleaning system 180 that are implemented to perform methods and other functions as disclosed herein relating to monitoring sensor cleaning capabilities, determining safe travel distances and selecting routes. The noted functions and methods will become more apparent in the following discussion of the figures.

Figure 2:
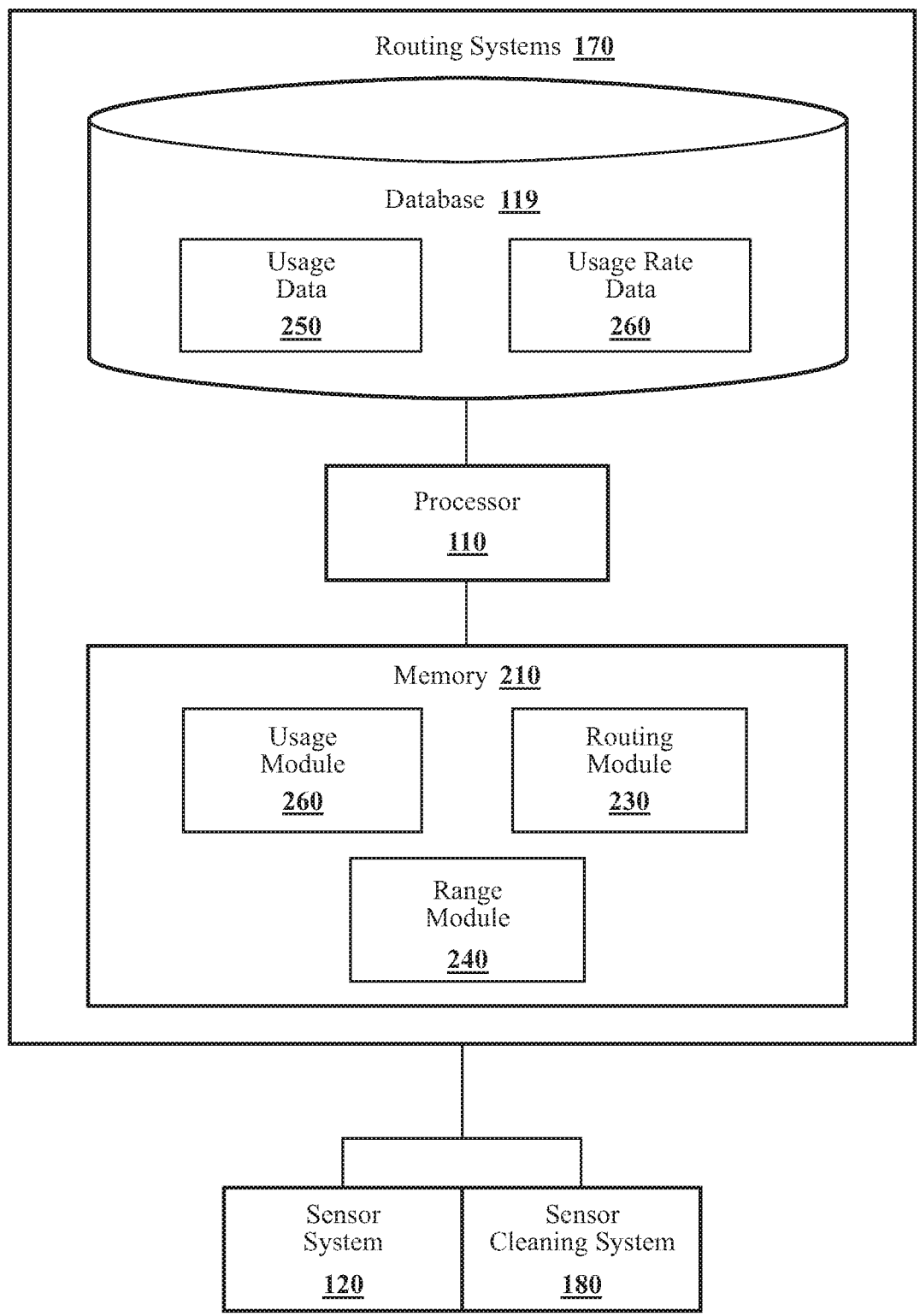
FIG. 2 illustrates one embodiment of a routing detection system according to the disclosed embodiments.

With reference to FIG. 2, one embodiment of the routing system 170 of FIG. 1 is illustrated. The routing system 170 is shown as including a processor 110 and database 119 from the vehicle 100 of FIG. 1. Accordingly, the processor 110 may be a part of the routing system 170, the routing system 170 may include a separate processor from the processor 110 of the vehicle 100 or the routing system 170 may access the processor 110 through a data bus or another communication path.

In one embodiment, the routing system 170 is operably connected with a vehicle sensor system 120 and the sensor cleaning system 180. The sensor cleaning system 180 includes one or more reservoirs for storing cleaning fluid for cleaning one or more sensors of the vehicle sensor system 120, and a cleaning mechanism, e.g., a spray nozzle, for using the cleaning fluid to clean the one or more sensors.

Additionally, the routing system 170, in one embodiment, includes a memory 210 that stores a usage module 220, a routing module 230, and a range module 240. The memory 210 can be constructed as a random-access memory (RAM), read-only memory (ROM), a hard-disk drive, a flash memory, or other suitable memory for storing the modules 220, 230 and 240. The modules 220, 230 and 240 are, for example, constructed as computer-readable instructions that when executed by the processor 110 cause the processor 110 to perform the various functions disclosed herein.

The routing system 170 includes a database 119 that stores, among other things, usage data 250 and usage rates 260, which will be described further below. The database 119, in one embodiment, is constructed as an electronic data structure stored in the memory 210 or another data store, such as the vehicle 100 data store 115, a cloud-based storage, a removable memory device, or another suitable location that is accessible to the modules 220, 230, and 240. The database 119 is configured with routines that can be executed by the processor 110 for analyzing stored data, providing stored data, organizing stored data, and so on. Thus, in one embodiment, the database 119 stores data described above (as well as other data) used by the modules 220, 230, and 240 in executing various functions.

The usage module 220 is generally constructed including instructions that function to control the processor 110 to record a log of cleaning fluid usage actions as usage data 250, and determine cleaning fluid usage rates per segment of travel based at least in part on the usage data 250. A "segment of travel" or "segment" can be defined herein as an interval or portion of a route that the vehicle 100 is traveling along. For example, a segment of travel can be a designated incremental distance (e.g., two miles) or a defined portion of a route (e.g., the portion of the route that lies on $5^{th}$ Street), or some other type of route segment. A route can therefore include one or multiple segments. Different routes can also include the same or overlapping segments for portions of the routes.

Figures 3A, 3B, 4:
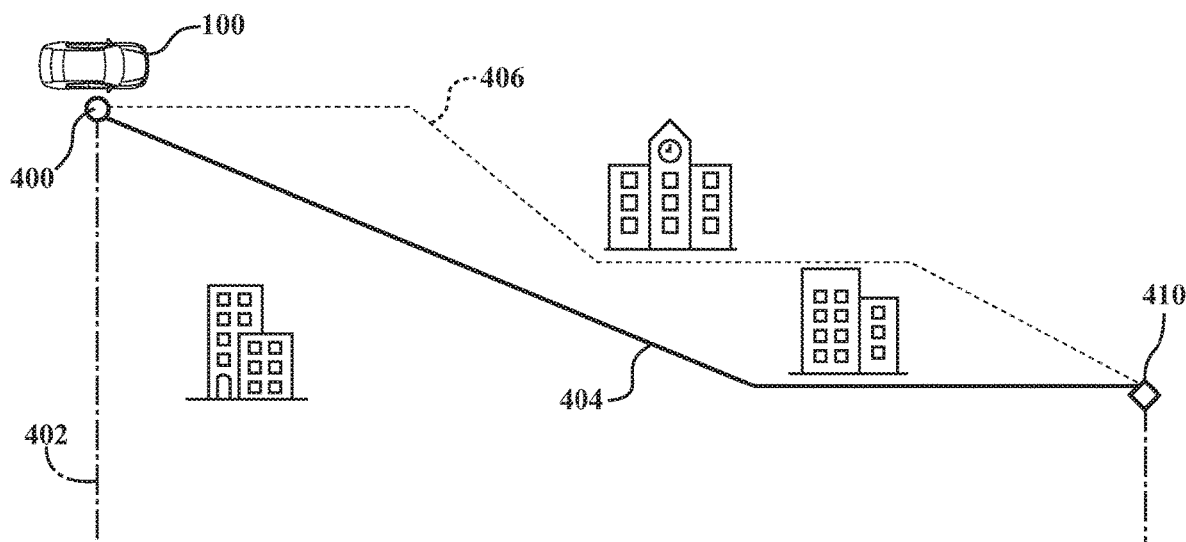
FIG. 3A illustrates one embodiment of usage data according to the disclosed embodiments.
FIG. 3B illustrates one embodiment of usage rates according to the disclosed embodiments.
FIG. 4 illustrates a scenario of a vehicle selecting a route from among a plurality of routes according to the disclosed embodiments.

As noted above, in one or more embodiments the usage module 220 can determine cleaning fluid usage rates per segment of travel based at least in part on usage data 250. FIG. 3A shows an example of usage data 250. In one or more embodiments the usage data 250 can be recorded in a table structure log 300 in database 119 and can include multiple parameters, such as a segment start location 310 and segment end location 320 that define the bounds of the segment (e.g., using global position system (GPS) coordinates or another location identifier), a number of cleaning actions 330 that occurred within the segment, an amount 340 of cleaning fluid that was used within the segment, a timestamp 350 for the data, and one or more conditions 360, such as weather related, traffic related, etc., that existed within the segment at the time the data was obtained. The table structure log 300 can include multiple entries, e.g., 370, 380, 390, etc.

It should be clear that table structure log 300 and parameters 310-360 represent one example implementation of usage data 250 and embodiments of the disclosed subject matter can include fewer or more parameters in different implementations of the disclosed routing system 170. For example, the number of cleaning actions 330 and amount 340 can further be broken up into sub-parameters for each individual sensor, which can differ from vehicle to vehicle. Furthermore, the structural type and the value types of the parameters can change per implementation. For example, in one or more embodiments the segment can be defined differently, e.g., as a street name or other designation.

While the usage module 220 can collect usage data 250 indicative of cleaning fluid usage by the vehicle 100, in one or more embodiments the usage module 220 can obtain usage data 250 associated with similar vehicles (e.g., vehicles that have a similar or identical make, model, year, etc., as the vehicle 100) that have traveled along relevant segments of travel. The usage module 220 can obtain the usage data 250, for example, via wireless communication through the transmission system 145 (FIG. 1) with the similar vehicles or with a cloud server that serves as a repository for usage data 250 from multiple vehicles. Thus, the usage module 220 can obtain usage data 250 from a reference vehicle, where the reference vehicle can be either the vehicle 100 itself or a similar vehicle.

FIG. 3B shows a table structure log 305 for storing usage rate data 260 determined by the usage module 220. The usage module 220 can determine usage rates 335 per segment based on the usage data 250. For example, entry 355 stores a usage rate of 6 mL for the segment beginning at location 41.03, 2.17 and ending at location 42.8, 3.9.

The amount of cleaning fluid used within a segment of travel can be impacted by various factors, such as the condition of the sensors when the vehicle 100 enters the segment or the condition of the weather during the particular instance of travel. For example, less cleaning fluid may be needed if the sensors have just recently been cleaned prior to entering the segment of travel, or more cleaning fluid may be needed if the road is muddy following a thunderstorm.

The disclosed routing system 170 can account for such variables in multiple ways. In one or more embodiments the usage module 220 can update a usage rate for a given segment of travel when the vehicle 100 subsequently travels on the given segment again. The update can be implemented in various ways. In one or more embodiments the update is implemented as an incremental adjustment. That is, for example referring to FIGS. 3A and 3B, after entry 380 of a first pass through a given segment, the usage module 220 can determine the usage rate for the segment to be the amount 340 of fluid used during the pass, i.e., 4 mL. However, after entry 390 of a second pass through the same segment during which the usage amount is 1 mL, the usage module 220 can adjust the usage rate determination incrementally down, e.g., in 0.5 mL increments, to 3.5 mL, as shown by entry 365. In this manner the usage module 220 can continually improve the usage rate determination over the course of repeated passes through segments of travel.

In one or more embodiments, the usage module 220 can refine the usage rate for a given segment in other ways, for example, by determining a usage rate of the given segment based on a rolling average of usage amounts 340, or other refining methods. In these manners the usage module 220 can continually learn more accurate use rates.

In one or more embodiments, the usage module 220 can determine more granular usage rate associations to account for various impact factors. For example, the usage module 220 can determine a usage rate for a segment of travel and for a given seasonal time range, day/night, weather condition, traffic condition, or any combination thereof (e.g., determine a usage rate per segment of travel and per weather condition). Referring to FIGS. 3A and 3B, for example, based on entry 370 from a first pass through a segment, the usage module 220 can determine a usage rate of 6 mL during snow weather conditions, as shown by entry 355. Similarly, based on entries 380, 390 from subsequent passes through the segment, the usage module 220 can determine a usage rate of 1.5 mL in clear weather conditions, as shown by entry 365. Any of the refining methods described above to improve the usage rate determination can be applied per granular level. That is, in one or more embodiments data obtained in repeated passes through a segment can be used to refine only corresponding granular usage rates, e.g., a snow weather condition usage data entry for a segment is used to refine the snow weather condition usage rate, but not the clear weather condition usage rate for the segment, etc.

Turning now to the routing module 230, the routing module 230 generally includes instructions that function to control the processor 110 to select a route to a location from among a plurality of routes to the location based at least in part on usage data 250 and/or usage rates 260 corresponding to one or more segments of travel that are along or form the plurality of routes. For example, referring to FIG. 4, a plurality of routes 402, 404, 406, may be available for the vehicle 100 to travel between a current location 400 and a desired destination 410. Each route can be constructed of one or more segments that have been previously partially or fully traveled by a vehicle 100. A conventional navigational system may select the most direct route, for example, route 404. However, in contrast, the routing module 230 can select a route based at least in part on usage rates 260 and/or usage data 250 that indicate which route is more ideal regarding one or more sensor maintenance factors.

The exact selection method used by the routing module 230 can depend on preferences set by the user. For example, a user may have different priorities or desires on different trips. However, by default, in one or more embodiments the routing module 230 can determine at a minimum whether the usage data 250/usage rates 260 indicate that traversing any of the possible routes 402, 404, 406 will result in exhausting the current sensor cleaning fluid and eliminate such routes from possible selection.

That is, due to differences in individual routes, a length of a given route does not necessarily correlate directly to a cleaning fluid usage rate 260. For example, referring to FIG. 4, it is possible for route 402 to have a lower usage rate 260 than route 404, even though route 404 is the shorter route. Route 404 may include, for example, segments of an older, less maintained road that has accumulated much debris and dirt, while route 402 may include, for example, segments of a newly paved road that is less used. The routing module 230 can predict, based on usage data 250 and usage rates 260, that route 404 will require an estimated 50 mL of cleaning fluid to traverse, route 406 will require an estimated 40 mL, and route 404 will require an estimated 10 mL. The vehicle 100 may have 30 mL of cleaning fluid available. In this case, the routing module 230 can select route 402.

The routing module 230 can therefore make predictions and eliminate routes from possible selection based on usage data 250 and usage rates 260. Similarly, in one or more embodiments the routing module 230 can eliminate from possible selection routes that are predicted to require above a threshold percentage of the remaining cleaning fluid, e.g., 80%.

Furthermore, in one or more embodiments the user can set a preference as to how heavily the routing module 230 should weight the predicted route usage rate/amount in making a route selection. For example, a user may strongly desire to preserve sensor cleaning fluid, or may instead prefer to travel the shortest route possible, or may prefer a balanced approach, etc. Accordingly, the routing module 230 can determine a score for the available routes that weights one or more of multiple factors, such as the route distance, the aggregate usage rate, traffic, and so on. For example, referring to FIG. 4, the routing module 230 can determine a route score $S_r$ for each of routes 402, 404, 406 as:

$$s_r = u_w \Sigma r_n + (T) t_w + (L) l_w$$

where $u_w$ is a usage rate weight, $r_n$ is a normalized usage rate per segment n, T is a traffic rating, $t_w$ is a traffic weight, L is a normalized length value indicating a length of the route, and $l_w$ is the length weight, with each route including one or more segments. In this implementation when a user desires to prioritize a given factor the user can adjust the weight parameters $u_w$, $t_w$, $l_w$, accordingly, and the routing module 230 will select a route in accordance with the user's priorities.

In another embodiment, the routing module 230 can select a route based at least in part on usage data 250 that indicates an impact on continuity of the drive. Recall that for an autonomous vehicle 100, cleaning actions temporarily disable autonomous operation of the vehicle 100 and require the user to either assume manual control or stop the vehicle 100. Referring to FIG. 4, usage data 250 may indicate that route 402 will require two cleaning actions, route 404 will require six cleaning actions, and route 406 will require three cleaning actions. In one or more embodiments the routing module 230 can select route 402 as having the least interruptions due to cleaning actions, or can use a scoring method as described above to rank the routes 402, 404, 406, and, for example, select route 406 as having the highest score balancing route length and minimizing disruptions, and so on.

In addition to the usage module 220 and the routing module 230, the disclosed routing system 170 can optionally include a range module 240. The range module 240 can dynamically determine an estimate distance that the vehicle 100 can travel according to a remaining amount of sensor cleaning fluid and display the estimate distance on a display in the vehicle 100. The range module 240 can further improve the determination based at least in part on usage data 250, particularly when usage data 250 is available for a given route or segment that the vehicle 100 is traveling along.

If no usage data 250 is available for the current route or segment, the range module 240 can determine an estimate based in part on an average usage rate that the vehicle 100 has exhibited across other routes or segments. In this case the average usage rate indicates an estimate that is particular to the vehicle 100 and the general environment that it tends to traverse. On the other hand, if usage data 250 is available for the route or segment that the vehicle 100 is traveling along, e.g., if the vehicle 100 changes from a previously untraveled route to a commonly traveled route for which usage data 250 is available, the range module 240 can dynamically determine the estimate distance that the vehicle 100 can travel according to the specific usage data 250 that is available instead of the general average.

In one or more embodiments, the routing module 230 can select a route based at least in part on the estimate distance from the range module 240. For example, if a given route is longer than the estimate distance, the routing module 230 can eliminate the route from possible selection.

Figure 5:
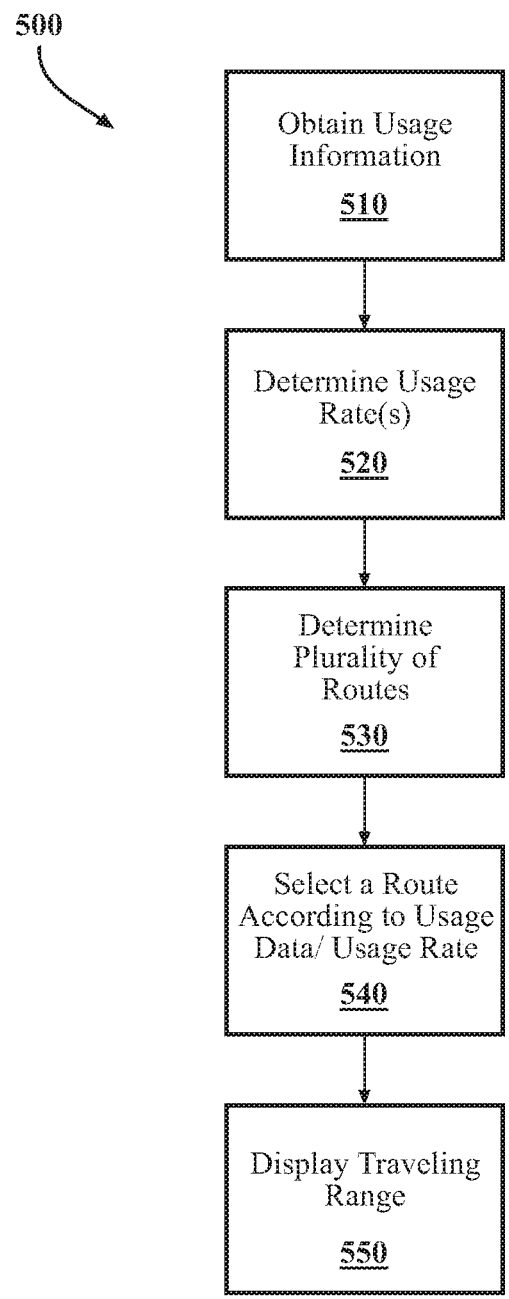
FIG. 5 illustrates a flow chart of a method of selecting a route according the disclosed embodiments.

FIG. 5 illustrates a flowchart of a method 500 of determining a route according to the disclosed embodiments. Method 500 will be discussed from the perspective of the routing system 170 of FIGS. 1 and 2. While method 500 is discussed in combination with the routing system 170, it should be appreciated that the method 500 is also not limited to being implemented within the routing system 170 but is instead one example of a system that may implement the method 400.

At operation 510, the routing system 170, e.g., usage module 220, obtains usage data 250 associated with one or more segments of travel. The usage data 250 indicates at least an amount of the cleaning fluid used while the vehicle 100 traveled along the one or more segments of travel, and can further indicate other parameters such as existing conditions (e.g. weather conditions, traffic conditions, etc.). The usage module 220 can obtain the usage data 250 as the vehicle 100 traverses the one or more segments of travel, for example, by storing a log of when sensor cleaning actions occur while the vehicle 100 is traversing the one or more segments of travel and how much cleaning fluid is used.

At operation 520 the usage module 220 can further determine one or more usage rates 260 associated with the segments of travel. The usage module 220 can determine the usage rates 260 at varying levels of granularity. For example, in one or more embodiments the usage module 220 can determine usage rates 260 per segment of travel and per weather condition. In one or more embodiments the usage module 220 can determine the usage rates 260 per segment of travel and per seasonal time range.

At operation 530 the routing system 170, e.g., routing module 240, determines a plurality of routes to a destination. The destination can be designated, for example, by a user inputting a desired destination or address in a navigation system 147 of the vehicle 100. Each of the routes can include one or more of segments of travel. The routes are nonidentical, but may include one or more overlapping segments of travel.

At operation 540 the routing system 170, e.g., routing module 240, selects a route from among the plurality of routes based at least in part on the usage data 250. In one or more embodiments the routing module 240 determines the selected route in accordance with user defined priorities. In one or more embodiments the routing module 240 can select the route based on usage rates 260, an amount of cleaning actions a route is predicted to require, an amount of cleaning fluid a route is predicted to consume or other criteria as discussed herein.

At operation 550, optionally, the range module 240 can dynamically determine a traveling range for the vehicle 100 based at least in part on an amount of cleaning fluid remaining in the one or more reservoirs of the sensor cleaning system 180 and display the traveling range on a display of the vehicle 100.

Accordingly, the disclosed routing system 170 can improve the operation of a vehicle 100, particularly an autonomous vehicle or a vehicle that includes autonomous or semi-autonomous features that rely on sensor data, by learning different impacts various locations and segments of travel can have on the sensor cleaning system and taking these impacts into account in selecting a route of travel for the vehicle 100. In this manner the vehicle can safely travel farther by extending the use of cleaning fluid through improved route selection and can, in autonomous mode, provide a trip with reduced interruptions for sensor cleaning.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s)

115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the routing system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the routing system 170, and/or the autonomous driving module(s) 160 may control some or all of these vehicle systems 140 and, thus, may be partially or fully autonomous.

The processor(s) 110, the routing system 170, and/or the autonomous driving module(s) 160 can be operatively connected to communicate with the various vehicle systems 140 and/or individual components thereof. For example, returning to FIG. 1, the processor(s) 110, the routing system 170, and/or the autonomous driving module(s) 160 can be in communication to send and/or receive information from the various vehicle systems 140 to control the movement, speed, maneuvering, heading, direction, etc. of the vehicle 100. The processor(s) 110, the routing system 170, and/or the autonomous driving module(s) 160 may control some or all of these vehicle systems 140.

The processor(s) 110, the routing system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the routing system 170, and/or the autonomous driving module(s) 160 can control the direction and/or speed of the vehicle 100. The processor(s) 110, the routing system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the routing system 170 can be configured to determine travel path(s) and determine current autonomous driving maneuvers for the vehicle 100, future autonomous driving maneuvers and/or modifications to current autonomous driving maneuvers based on data acquired by the sensor system 120 and/or routing system 170, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A routing system of a vehicle, comprising:
one or more sensors configured to acquire information about an environment around the vehicle;
one or more reservoirs for storing cleaning fluid for cleaning the one or more sensors;
one or more processors; and
a memory communicably coupled to the one or more processors and storing:
a usage module including instructions that when executed by the one or more processors cause the one or more processors to obtain usage data associated with one or more segments of travel, the usage data indicating at least an amount of the cleaning fluid used while a reference vehicle traveled along the one or more segments of travel; and
a routing module including instructions that when executed by the one or more processors cause the one or more processors to determine a plurality of routes to a destination and select a route from among the plurality of routes based at least in part on the usage data indicating that, among the plurality of routes, the route will result in a least amount of interruptions to an autonomous driving mode due to use of the cleaning fluid, wherein one or more of the plurality of routes include one or more of the segments of travel.

2. The routing system of claim 1, wherein the reference vehicle is one selected from the group of: the vehicle, and a different vehicle that traveled along the one or more segments of travel.

3. The routing system of claim 1, wherein:
the usage module includes instructions to determine a usage rate per segment of travel based at least in part on the usage data; and
the instructions to select the route further comprise instructions to select the route based at least in part on the usage rate.

4. The routing system of claim 3, wherein the instructions to determine the usage rate per segment of travel further comprise instructions to determine the usage rate per seasonal time range.

5. The routing system of claim 3, wherein the instructions to determine the usage rate per segment of travel further comprise instructions to determine the usage rate per weather condition.

6. The routing system of claim 1, wherein the usage data further indicate a number of cleaning actions that occur per segment of travel for the one or more segments of travel, a cleaning action being a use of the cleaning fluid by the vehicle, and wherein the instructions to select the route further comprise instructions to select the route based at least in part on the route having a least number of cleaning actions.

7. The routing system of claim 1, further comprising a range module including instructions that when executed by the one or more processors cause the one or more processors to dynamically determine a traveling range for the vehicle based at least in part on an amount of cleaning fluid remaining in the one or more reservoirs, and display the traveling range on a display of the vehicle.

8. A method of determining a travel route for a vehicle, comprising:

obtaining usage data for one or more segments of travel, the usage data indicating at least an amount of sensor cleaning fluid used during travel of the vehicle along the one or more segments;

determining a plurality of routes to a destination; and selecting a route from among the plurality of routes, the route being selected based at least in part on the usage data indicating that, among the plurality of routes, the route will result in a least amount of interruptions to an autonomous driving mode due to use of the cleaning fluid.

9. The method of claim 8, further comprising:

determining a usage rate per segment of travel based at least in part on the usage data, wherein the selecting the route further comprises selecting the route based at least in part on the usage rate.

10. The method of claim 9, wherein the determining the usage rate includes determining the usage rate per weather condition.

11. The method of claim 9, wherein the determining the usage rate includes determining the usage rate per seasonal time range.

12. The method of claim 8, wherein the usage data further indicate a number of cleaning actions that occur per segment of travel for the one or more segments of travel, wherein a cleaning action is a use of the cleaning fluid by the vehicle.

13. The method of claim 12, wherein the selecting the route comprises selecting the route based at least in part on the route having a least number of cleaning actions.

14. The method of claim 8, further comprising:

dynamically determining a traveling range for the vehicle based at least in part on an amount of cleaning fluid remaining in one or more reservoirs of the vehicle; and displaying the traveling range on a display of the vehicle.

15. A non-transitory computer-readable medium for determining a travel route for a vehicle, including instructions that, when executed by one or more processors, cause the one or more processors to:

obtain usage data for one or more segments of travel, the usage data indicating at least an amount of sensor cleaning fluid used during travel of the vehicle along the one or more segments;

determine a plurality of routes to a destination; and select a route from among the plurality of routes, the route being selected based at least in part on the usage data indicating that, among the plurality of routes, the route will result in a least amount of interruptions to an autonomous driving mode due to use of the cleaning fluid.

16. The non-transitory computer-readable medium of claim 15, further including instructions to:

determine a usage rate per segment of travel based at least in part on the usage data, wherein the instructions to select the route further comprise instructions to select the route based at least in part on the usage rate.

17. The non-transitory computer-readable medium of claim 16, wherein the instructions to determine the usage rate further comprise instructions to determine the usage rate per segment and per weather condition.

18. The non-transitory computer-readable medium of claim 15, wherein the usage data further indicate a number of cleaning actions that occur per segment of travel for the one or more segments of travel, wherein a cleaning action is a use of the cleaning fluid by the vehicle.

19. The non-transitory computer-readable medium of claim 18, wherein the instructions to select the route further comprise instructions to select the route based at least in part the route having a least number of cleaning actions.

20. The non-transitory computer-readable medium of claim 15, further including instructions to:

dynamically determine a traveling range for the vehicle based at least in part on an amount of cleaning fluid remaining in one or more reservoirs of the vehicle; and display the traveling range on a display of the vehicle.

* * * * *